US008562145B2

(12) United States Patent
Roberts et al.

(10) Patent No.: US 8,562,145 B2
(45) Date of Patent: Oct. 22, 2013

(54) DISPLAY SYSTEM AND METHOD FOR PROJECTION ONTO NON-PLANAR SURFACES

(75) Inventors: Ralph R. Roberts, Cottage Grove, MN (US); Glenn E. Casner, Woodbury, MN (US); Brett J. Sitter, Duluth, MN (US); Jane K. Wardhana, Woodbury, MN (US); Brian T. Weber, Saint Paul, MN (US); Kenneth A. Epstein, Saint Paul, MN (US); Martin B. Wolk, Woodbury, MN (US); Patrick A. Thomas, Lake Elmo, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 288 days.

(21) Appl. No.: 13/165,896

(22) Filed: Jun. 22, 2011

(65) Prior Publication Data

US 2012/0327297 A1  Dec. 27, 2012

(51) Int. Cl.
*G03B 21/14* (2006.01)

(52) U.S. Cl.
USPC .................................. 353/77; 353/98; 353/79

(58) Field of Classification Search
USPC .......... 353/28, 69, 70, 74, 77, 78, 79; 352/69; 359/451, 449, 453; 348/36
See application file for complete search history.

(56) References Cited

U.S. PATENT DOCUMENTS

| 3,586,432 A | 6/1971 | Pentes, Jr. |
| 3,880,509 A | 4/1975 | Herndon |
| 3,895,861 A | 7/1975 | Herndon |
| 4,901,140 A | 2/1990 | Lang et al. |
| 6,327,020 B1* | 12/2001 | Iwata ............................... 352/69 |
| 6,407,859 B1 | 6/2002 | Hennen et al. |
| 6,409,351 B1* | 6/2002 | Ligon ............................... 353/98 |
| 6,594,448 B2 | 7/2003 | Herman et al. |
| 6,644,816 B1* | 11/2003 | Perra et al. .................... 353/119 |
| 6,822,792 B2 | 11/2004 | Goto |
| 7,012,669 B2 | 3/2006 | Streid et al. |
| 7,057,810 B2 | 6/2006 | Thomas et al. |
| 7,118,228 B2* | 10/2006 | May ................................ 353/99 |
| 7,183,210 B2 | 2/2007 | Shibano et al. |
| 7,467,872 B2 | 12/2008 | Hisada et al. |
| 7,604,354 B1* | 10/2009 | Ligon ............................. 353/30 |
| 2002/0167618 A1 | 11/2002 | Lane |
| 2005/0024722 A1 | 2/2005 | Agostinelli et al. |
| 2005/0219473 A1* | 10/2005 | Moriyama et al. ............... 353/79 |
| 2013/0033650 A1* | 2/2013 | Roberts et al. ................. 348/744 |

FOREIGN PATENT DOCUMENTS

| BE | 858178 | 12/1977 |
| CA | 2 697 145 | 2/2008 |
| DE | 198 22 879 | 12/1999 |
| DE | 10 2006 025 638 | 12/2007 |

(Continued)

*Primary Examiner* — William C Dowling

(57) ABSTRACT

A system for projecting changeable electronic content, such as video or digital still images, onto a curved surface. The system includes a housing, a reflector within the housing, and a projector. The housing has an exterior surface and an interior space. At least a portion of the exterior surface is a curved display surface capable of displaying electronic content projected upon it, and at least one portion of the exterior surface has an aperture through the exterior surface to the interior space. The projector is located proximate the aperture for projecting content through the aperture to the reflector. When the projector receives converted content and projects the converted content through the aperture to the reflector, the curved display surface displays the converted content undistorted to a viewer. The system can also provide for display of branded content on a product container having a shape corresponding with the brand.

15 Claims, 13 Drawing Sheets

(56) References Cited

FOREIGN PATENT DOCUMENTS

| | | |
|---|---|---|
| FR | 2 473 190 | 7/1981 |
| JP | 6-273693 | 9/1994 |
| JP | 2004-233609 | 8/2004 |
| JP | 2008-268240 | 11/2008 |
| WO | WO 99/37949 | 7/1999 |
| WO | WO 00/73940 | 12/2000 |
| WO | WO 01/04701 | 1/2001 |
| WO | WO 2010/108198 | 9/2010 |

* cited by examiner

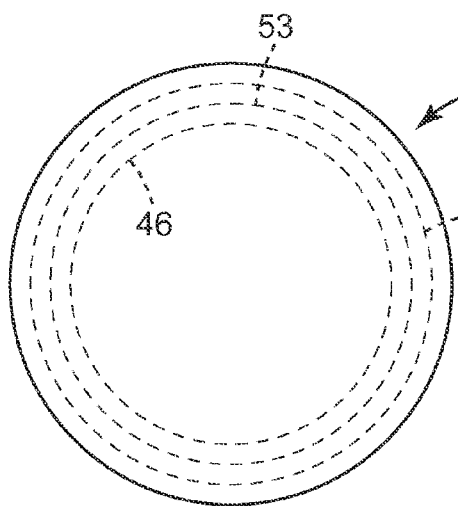
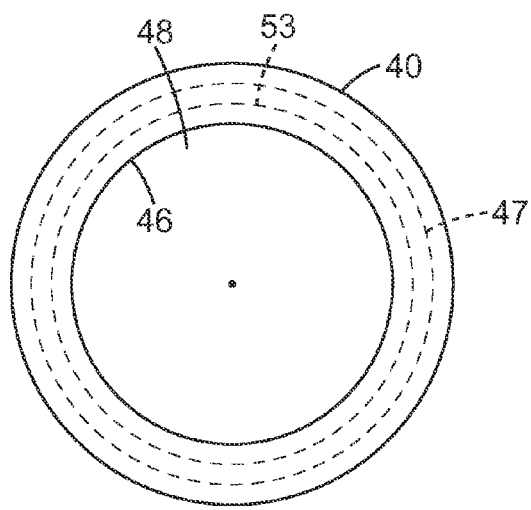
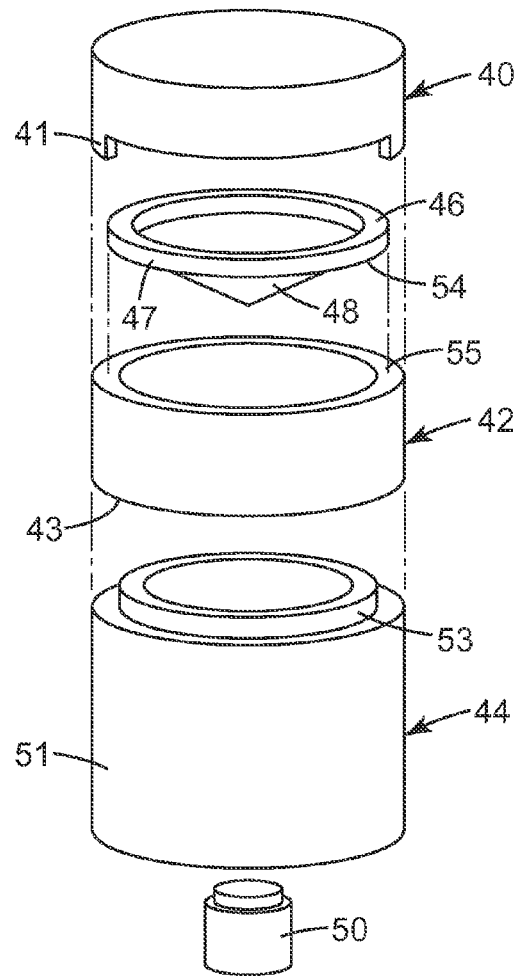

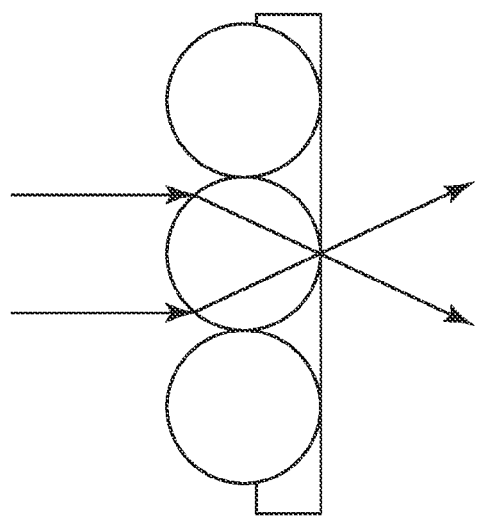
*Fig. 10a*
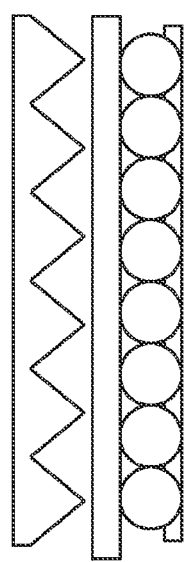
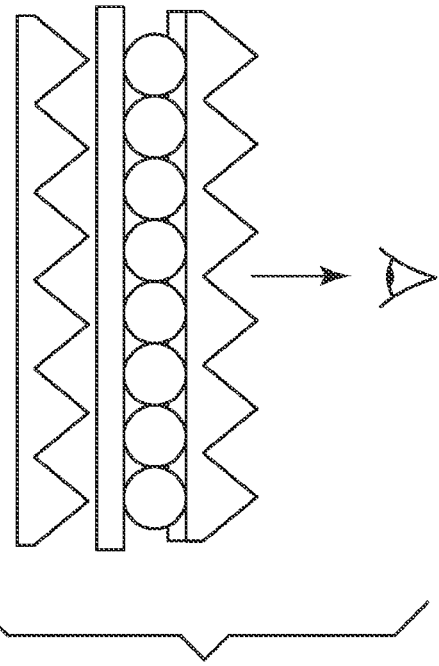
*Fig. 10b*  *Fig. 10c*

DISPLAY SYSTEM AND METHOD FOR PROJECTION ONTO NON-PLANAR SURFACES

BACKGROUND

Consumers have become inundated with static image content at the point of purchase. The static image content typically promotes or provides information about products in an attempt to influence consumers' purchasing decisions. However, determining the effectiveness of such static image content can be difficult. There is thus a need for new ways to attract the attention of consumers in providing them with advertisements or other product promotional content. One approach involves converting these static surfaces to video surfaces and providing video content for advertisements, attempting to attract consumers' attention through an active type of content. This video content is typically provided on flat screen display devices, such as liquid crystal display devices, proximate or near the product being promoted. The effectiveness of this type of advertisement may be limited when the consumers are simply viewing potential products to purchase and not viewing the display. Accordingly, there is a need for a new way to delivery video content, particular on curved surfaces that may resemble actual product containers.

SUMMARY

A system for projecting changeable electronic content onto a curved surface, consistent with the present invention, includes a housing, a reflector within the housing, and a projector. The housing has an exterior surface and an interior space. At least a portion of the exterior surface is a curved display surface capable of displaying changeable electronic content projected upon it, and at least one portion of the exterior surface has an aperture through the exterior surface to the interior space. The projector is located proximate the aperture for projecting content through the aperture to the reflector. Alternatively, the projector can be located inside the housing, and in that embodiment an aperture is not needed. When the projector receives converted content and projects the converted content through the aperture to the reflector, the curved display surface displays the converted content undistorted to a viewer.

BRIEF DESCRIPTION OF THE DRAWINGS

The accompanying drawings are incorporated in and constitute a part of this specification and, together with the description, explain the advantages and principles of the invention. In the drawings.

FIG. 5 is a top view of the housing for the projection system;

FIG. 6 is a bottom view of the housing for the projection system;

FIG. 7 is an exploded perspective view of the housing for the projection system;

FIGS. 10*a*-10*c* are diagrams of display screen configurations for the Examples;

DETAILED DESCRIPTION

Embodiments of the present invention can provide a point-of-purchase projection display system where the intent is to convert static surfaces to electronic display surfaces to display video or changeable electronic still images. These surfaces can include projection onto brand specific shapes with brand specific content. Projection of video or other electronic content onto curved surfaces, particularly onto brand specific shapes, allows for new types of advertising, product promotion, and information delivery.

Figure 1:
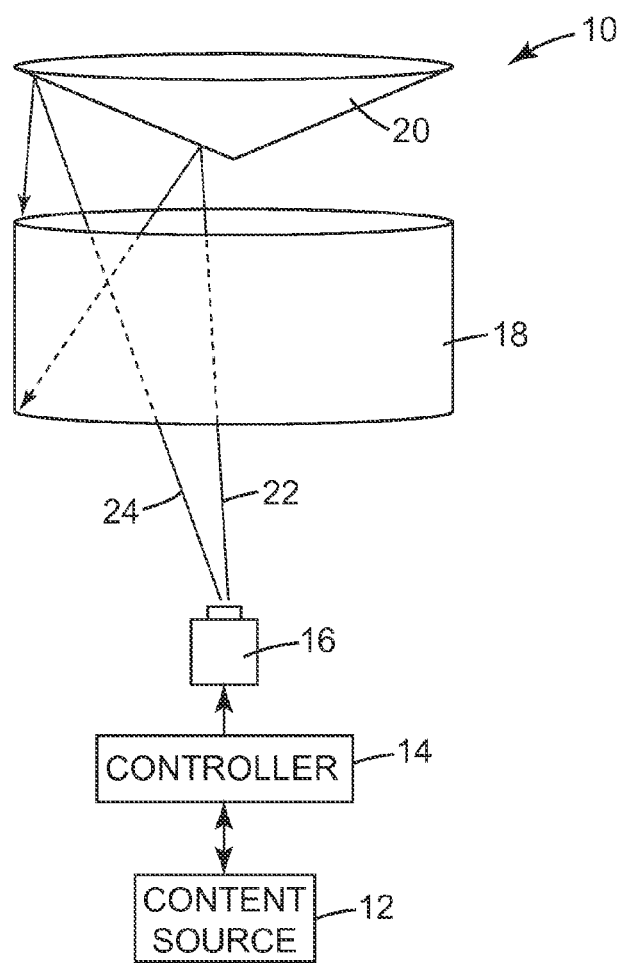
FIG. 1 is an exploded diagram of a projection system for providing changeable electronic content on a curved surface.

FIG. 1 is an exploded diagram of a projection system 10 for providing changeable electronic content on a curved surface. System 10 includes a content source 12, a controller 14, a projector 16, a curved display surface 18, and a conical reflector 20. Controller 14 receives content from content source 12 and provides it to projector 16 to be projected upon display surface 18 via conical reflector 20. The changeable electronic content can include electronic video content or changeable electronic (digital) still images.

Controller 14 can be implemented with a computer or other processor-based device, and content source 12 can be implemented with a memory device. Controller 14 can include a wired or wireless connection with projector 16, and it can include connections with multiple projectors for displaying content on many projection systems incorporated into different housings. Controller 14 can convert the content to be displayed, or receive content already converted. This conversion is required for curved display surface 18 to display the converted content undistorted to a viewer, meaning it displays the electronic content as it would appear on a flat display for which the original content was intended.

Conical reflector 20 preferably has a cone angle such that the projected content is uniformly displayed across display surface 18 as represented by lines 22 and 24. Conical reflector 20 can be implemented with, for example, a mirror film laminated or otherwise adhered to a substrate for mechanical support to maintain the mirror film in the desired configuration. Alternatively, the reflector can be a thermoformable mirror.

Conical reflector 20 can have a full conical mirror for projecting content onto a full 360° of curved display surface 18, as shown, or can have a partial conical mirror for projecting and displaying content on only a portion of curved display surface 18. Conical reflector 20 can optionally be curved in the axial direction in addition to the radial direction and thus resemble a convex or curve sided cone, and the reflector can optionally be a truncated cone. Also, in this embodiment any rotationally symmetric surface can be used to implement the reflector. The Examples provide a method for calculating the cone angle for the reflector in order to substantially uniformly display the converted content. Although curved display surface 18 is shown as a cylindrical surface, other types of curved display surfaces are possible, including a combination of planar and non-planar surfaces for the display surface. Also, multiple reflectors or a system of reflectors can optionally be used with the display surface.

Figure 2:
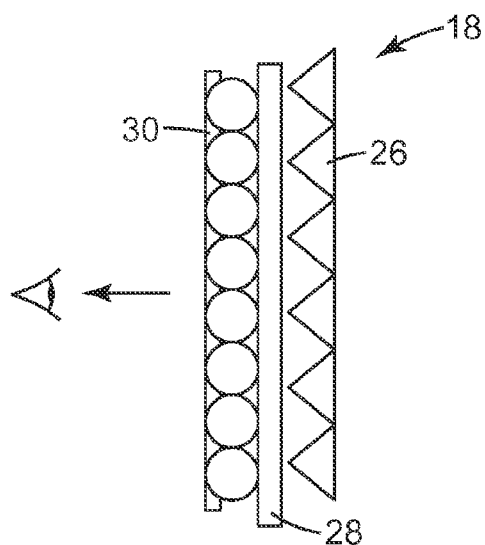
FIG. 2 is a diagram of exemplary components of a display surface for the projection system.
Figure 3:
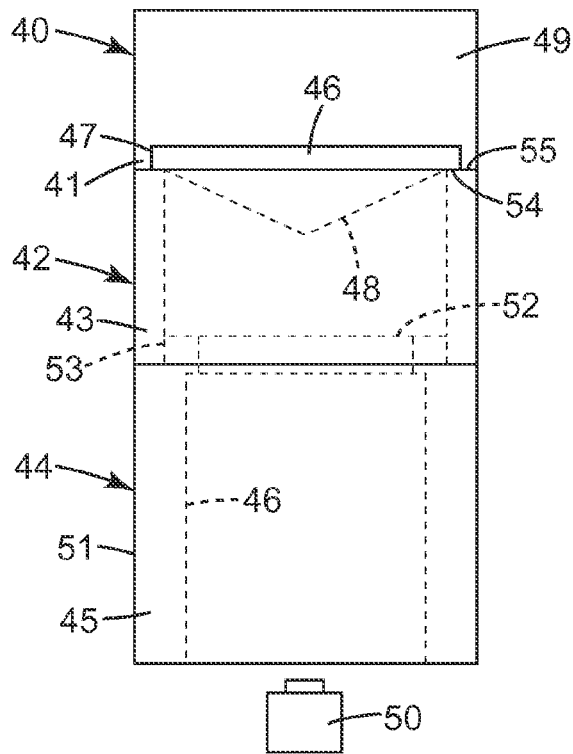
FIG. 3 is a side view illustrating a housing for the projection system.
Figure 4:
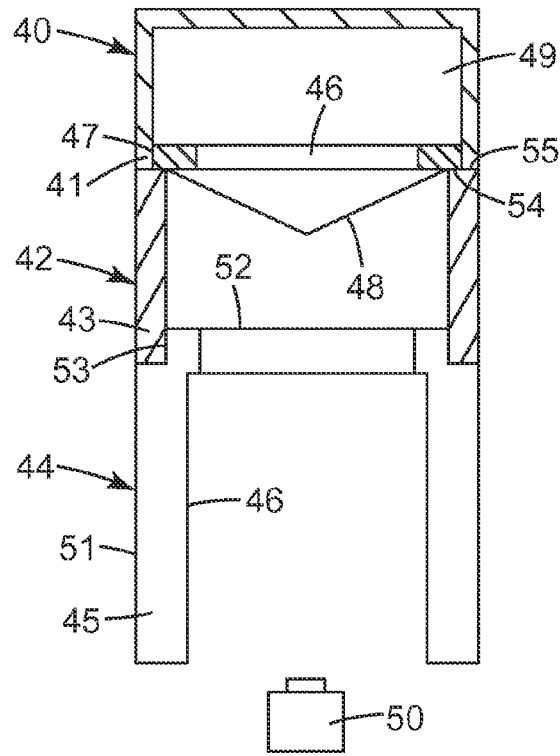
FIG. 4 is a side sectional view of the housing for the projection system.

FIG. 2 is a diagram of exemplary components of curved display surface 18 for the projection system. In this embodiment, display surface 18 includes a turning film 26, a support substrate 28, and a rear projection film (RPF) 30. As an alternative to RPF 30, other films can be used such as films having lenslet arrays, lenticular arrays, micro-Fresnel lens arrays, or micro-Fresnel lenticular arrays. Turning film 26 receives the projected content from reflector 20 and redirects the projected light to provide the content at a desired viewing angle. Support substrate 28 can be implemented with a transparent polymeric film or glass cylinder, for example, and provides mechanical support for turning film 26 and rear projection film 30. Support substrate 28 is optional in that for certain embodiments the turning film and display surface can themselves have sufficient mechanical support. The components of curved display surface 18 can be laminated or otherwise adhered together. Alternatively, the display surface can be a thermoformable screen.

Curved display surface 18 can optionally include another turning film on the viewer side of rear projection film 30. The turning films can be designed for a desired primary viewing angle for the curved display surface, for example a viewer looking directly at the display surface, up at the display surface, or down at the display surface. Furthermore, the turning film can be designed such that the display surface appears darker off axis from the desired viewing angle.

FIGS. 3-7 conceptually illustrate a housing for containing the projection system of FIGS. 1 and 2. FIGS. 3-7 are, respectively, side, side sectional, top, bottom, and exploded perspective views of the housing with the projection system. As shown in FIGS. 3-7, the housing in this embodiment includes a lid 40, curved display surface 42 corresponding with display surface 18, a base 44, and a conical reflector 48. Reflector 48 is supported by a ring 46, which has a portion 54 resting on a top edge 55 of display surface 42. Lid 40 has a bottom edge 41 that can fit against an edge 47 of ring 46 and be held in place by friction. Lid 40 also has a hollow space 49. Base 44 has a top ring 52, and a bottom edge 43 of display surface 42 can fit against an edge 53 of ring 52 and be held in place by friction. Display surface 42 also fits on top of base 44 as shown. Base 44 includes an inner wall 46, an outer wall 51, and a hollow space 45 between walls 46 and 51. Inner wall 46 of base 44 forms an aperture such that projector 50 can project content through the aperture to reflector 48 to be reflected and displayed on display surface 42 as illustrated in FIG. 1. Alternatively, the projector can be located inside the housing, and in that embodiment an aperture is not needed. The components of the housing along with the display surface can be removable, as shown in FIG. 7, or they can be fixed together using an adhesive, for example. Alternatively, the housing can be formed of a one piece enclosure, and the housing can form a complete or partial enclosure.

Figure 8:
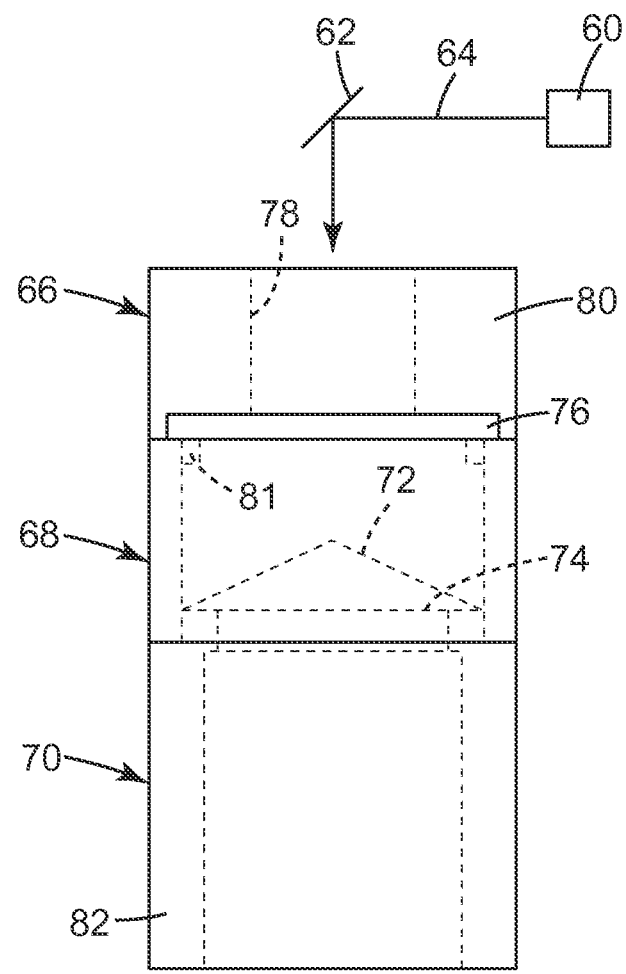
FIG. 8 is a side view of an alternate embodiment of a housing for the projection system.

FIG. 8 is a side view of an alternate embodiment of a housing for the projection system. In this alternate embodiment, a projector 60 is located above the housing. The housing includes a lid 66, a curved display surface 68 corresponding with display surface 18, and a base 70. Lid 66 includes an aperture 78 and a hollow space 80 surrounding the aperture. A ring 76 can rest on a top edge of display surface 68 and includes a lower ring portion 81 to fit inside of display surface 68 and hold ring 76 in place by friction. Lid 66 can also rest against ring 76 and be held in place by friction. Base 70 includes a hollow space 82, similar to base 44, and also includes a ring 74. A reflector 72 is mounted on ring 74, and display surface 68 can be held in place against ring 74 by friction. In use, projector 60 projects content through aperture 78 by reflecting the content using a mirror 62 as illustrated by line 64. Mirror 62 is optional in that for certain embodiments the projector can project content directly into the housing. The projected content is reflected by reflector 72 to be displayed by display surface 68, as illustrated in FIG. 1 except in an inverse configuration. This alternate embodiment can provide for use of a ceiling mounted projector, for example.

The curved display surface can be located at a variety of locations in the housing. In FIGS. 3-8, the curved display surface is shown being located between a lid and base. However, the curved display surface can be located at a position of the lid or beneath the base. Furthermore, the height of the base and lid can be varied to change a vertical position of the curved display surface. Locating the curved display surface between a base and lid provides for a location used by many product containers for displaying labels or other static content, meaning the content displayed by the curved display surface would be in the same approximate position on the housing having an exterior surface resembling a product container as on the actual product container.

In FIGS. 3-8, the housing for the projection system is shown as a cylinder only for illustrative purposes. The housing can have a variety of three-dimensional shapes, depending upon, for example, the content to be displayed. The housing shape may correspond with a branded shape with the housing thus resembling an actual product container having a shape indicating a brand or type of product contained within it. With various housing shapes, the hollow spaces in the bases and lids can be used to contain an actual product. For example, the hollow spaces can contain a product corresponding with a branded shape of a product container resembled by the housing. In this manner, the housing can appear to be the actual product container with the product, as the aperture would not be visibly apparent through the product in the hollow spaces. In other embodiments the housing need not have hollow spaces and can instead simulate the product by being painted or having static content on it.

If the housing resembles a branded product container, the type of conversion required for the content can be selected based upon the branded shape. The controller can store conversion algorithms associated with particular branded shapes and select the algorithm required to display content undistorted on the particular branded shape. As an alternative, the controller can digitize curved display surfaces associated with particular shapes in order to select an algorithm to convert content for a particular digitized curved display surface. The digitized surface can be characterized by, for example, the parameters of size, elevation, and shape. The selected algorithm can perform pixel remapping of the content for the particular shape of the curved display surface. The content can be converted and stored for later display or converted essentially in real-time according to the algorithm.

The Examples provide exemplary materials and components for implementing the housing and projection system, although other types of materials and components can be used. Also, the Examples provide an exemplary algorithm for pixel remapping for image conversion, which can be stored in software or firmware and executed by the controller. Alternatively, the algorithm can be stored in hardware, such as a custom integrated circuit chip, or a combination of hardware and software.

EXAMPLES

To demonstrate the conversion of a static surface to a digital curved surface for displaying changeable electronic content we detail below the procedure for projection onto a two liter (2 L) COCA-COLA soda bottle (The Coca-Cola Company). This example is not limiting but can be generalized to a number of cylindrical or contoured surfaces.

Optical Bench Set-Up

Figure 9A:
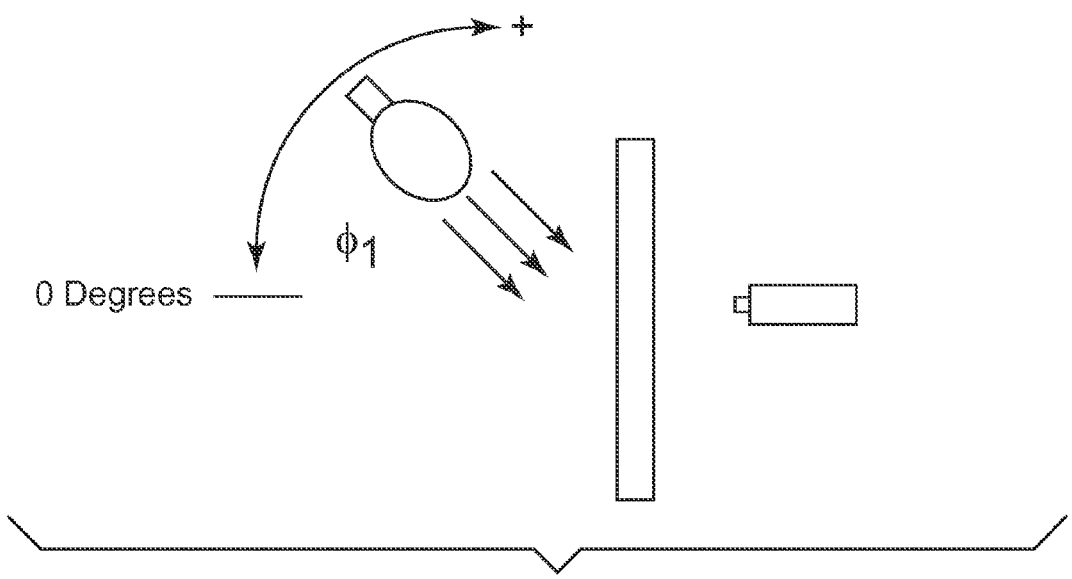
FIGS. 9*a* and 9*b* are diagrams of optical bench set-up configurations for the Examples.

An optical bench was fitted with a Minolta LS-100 luminance meter (Konica Minolta Sensing Americas, Inc.), a FOSTEC Ace light source (SCHOTT Corporation) and a fiber optic light guide. The light guide was coupled to a sample holder on a rotating stage. The luminance meter was similarly fitted onto an independent rotating stage. Test samples of about 3 square inches were used unless otherwise noted. FIG. 9 shows the two optical bench set-ups that were used with a projection screen located between a light source and detector as shown. FIG. 10 shows various display screen configurations that were examined. A commercial 3M MPro 160 pico-projector (3M Company) was used as the video source for the display.

Ray Tracing

Figure 11:
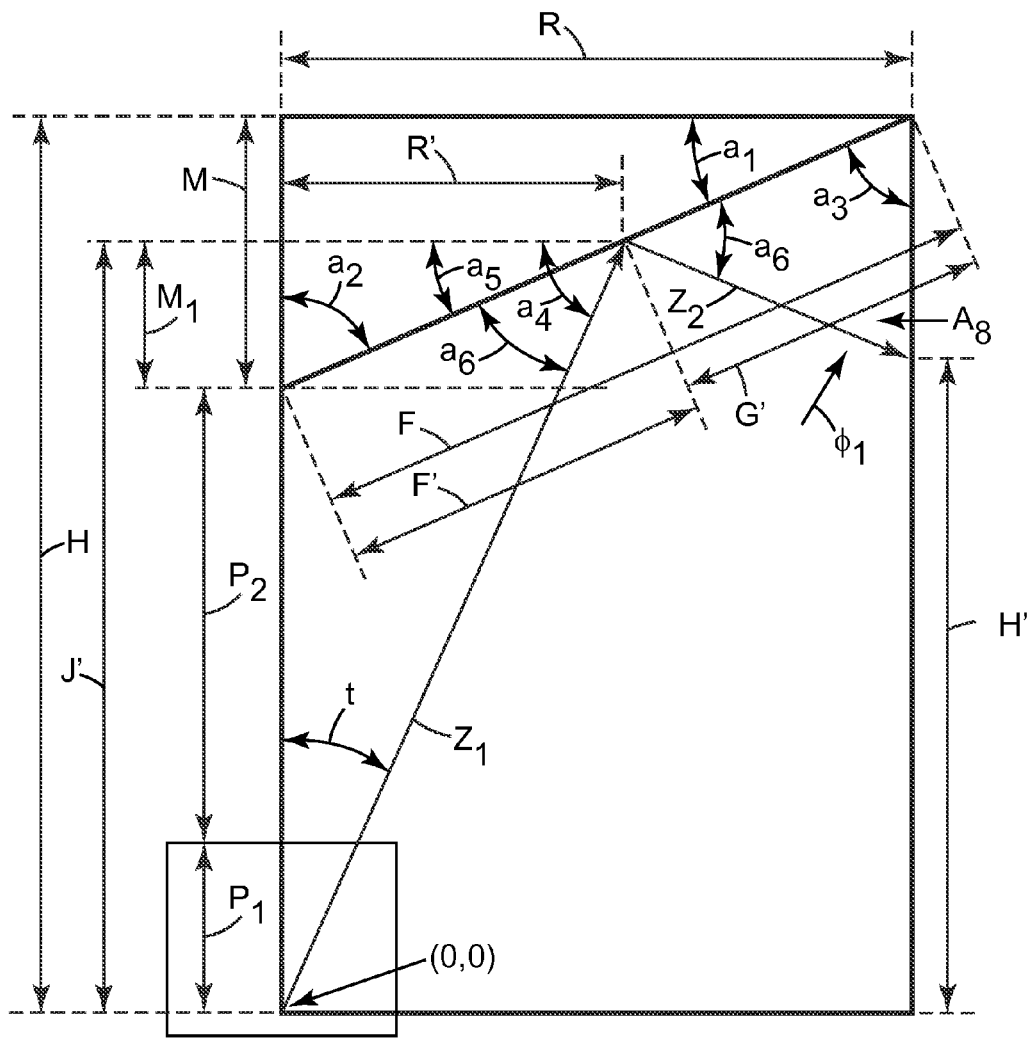
FIG. 11 is a diagram illustrating ray tracing from the projector to the cone mirror to the display screen for the Examples.

FIG. 1, described above, was the proposed design layout of the projector, reflective cone mirror and 360°-view label that was to be converted to a digital surface. Ray tracing was used in the design process and implemented using the MATLAB program (The MathWorks, Inc.) or the Excel program (Microsoft Corporation) to trace the MPro 160 pico-projector optical path. FIG. 11 shows the parameters used with the projector located at coordinate (0,0). We considered all rays to originate from a point source (coordinate (0,0)) a distance $P_1$ (where $P_1$=4.3 mm) behind the projector lens. The distance $P_1$ was determined from the equation for the throw diameter of the projector and is defined as the throw distance at zero throw diameter.

Throw Diameter(mm)=0.50(throw distance)+2.15
(*MPro* 160 pico-projector)

The throw distance from the projector to the mirror is that distance which produces a circular image equal to the diameter of the bottle. This diameter was chosen to be 105 mm=2R where R is the radius of the base of the cone mirror.

Then we defined the following parameters:
H=perpendicular distance from point source (0,0) to the base of the cone mirror.

$P_2$=distance from the front of the projector to the cone apex. For each distinct base angle $a_1$ of the cone, the following are the fixed variables.

$a_3 = 90° - a_1$
$a_2 = 90° - a_1$
$a_5 = a_1$
$M = R\tan(a_1)$
$F = (R^2 + M^2)^{1/2}$ As shown in FIG. 11, a ray originating from point source (0,0) of length $Z_1$ impinges on the mirror at an angle $a_6$. The following parameters are dependent upon the direction of this ray.

$$M' = \frac{MR'}{R}$$

$$J' = P_1 + P_2 + M'$$

$$t_7 = \tan^{-1}\left(\frac{R'}{J'}\right)$$

$$a_4 = 90° - t_7$$

$$a_6 = a_4 - a_1$$

$$F' = [(R')^2 + (M')^2]^{1/2}$$

$$G' = F - F'$$

$$a_8 = 180° - a_6 - a_3$$

$$H' = H - \left[\frac{G'\sin(a_6)}{\sin(a_8)}\right]$$

where $\left[\frac{G'\sin(a_6)}{\sin(a_8)}\right]$ is_the_screen_height $$Z_1 = [(J')^2 + (R')^2]^{1/2}$$

$$Z_2 = \frac{G'\sin(a_3)}{\sin(a_8)}$$

$$Z_{total} = Z_1 + Z_2$$

Example 1

Optimization of Mirror Cone Angle $a_1$ for Projection onto the Bottle Label

Figure 12:
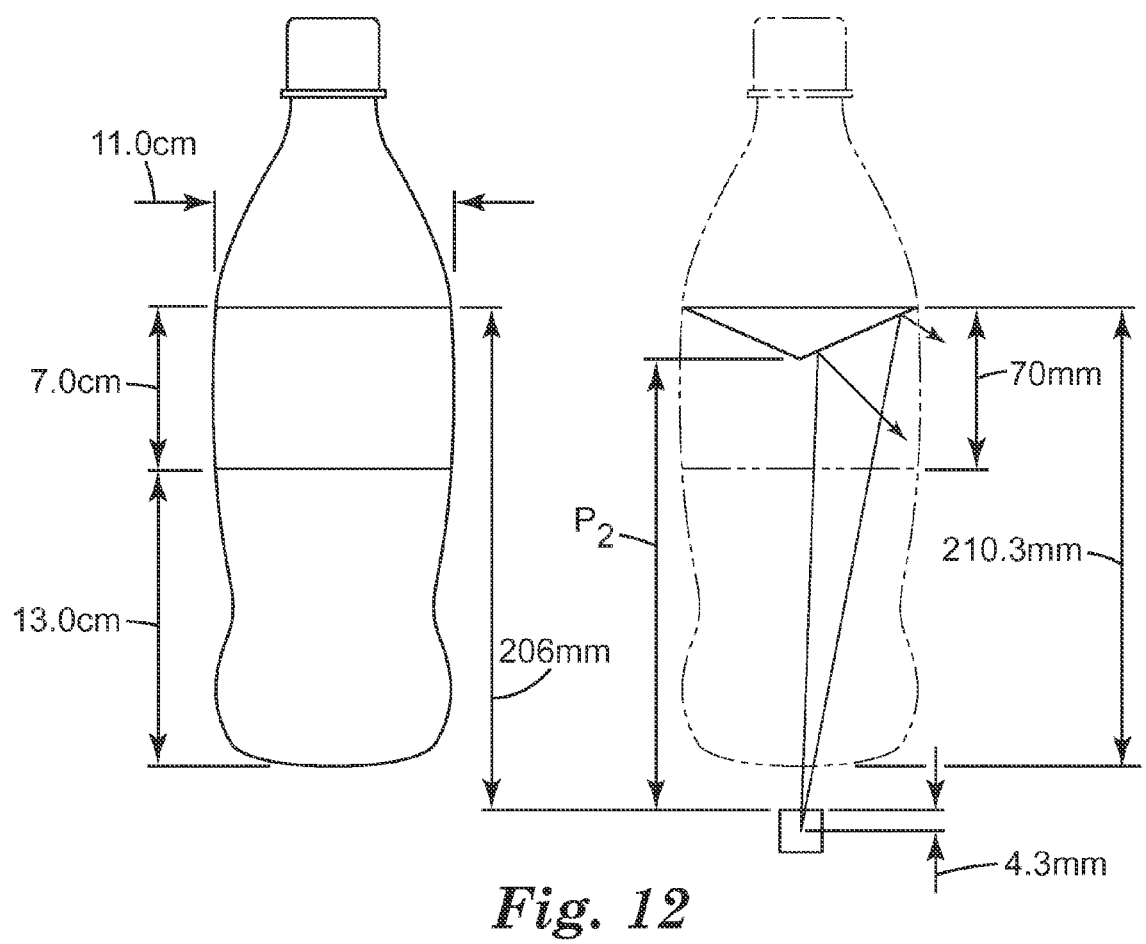
FIG. 12 is a diagram illustrating the projector and cone mirror configuration in the bottle display for the Examples.

FIG. 12 shows the relevant 2 L bottle dimensions and optics configuration used in the optimization of cone base angle $a_1$. It is required that the ray striking the circular mirror be projected to give a screen height of 70 mm. Of the Examples of Table 1, Example 1d, provided output data showing that a cone base angle of 16° results in approximately the required projection.

TABLE 1

Optimization of cone base angle $a_1$ for a 70 mm screen high display
(all lengths in mm, throw distance = 206 mm).

| Example | R | P1 | $a_1$ | M | F | R' | $P_2$ | H | $t_7$ | $A_8$ | $\phi_1 =$ (90 − $A_8$) | Screen Height |
|---|---|---|---|---|---|---|---|---|---|---|---|---|
| 1a | 52.5 | 4.3 | 10 | 9.26 | 53.3 | 50.0 | 196.7 | 210.3 | 13.4 | 33.4 | 56.6 | 108.5 |
| 1a | 52.5 | 4.3 | 10 | 9.26 | 53.3 | 10.0 | 196.7 | 210.3 | 2.8 | 22.8 | 67.2 | |
| 1b | 52.5 | 4.3 | 12 | 11.16 | 53.7 | 50.0 | 194.8 | 210.3 | 13.4 | 37.4 | 52.6 | 93.0 |
| 1b | 52.5 | 4.3 | 12 | 11.16 | 53.7 | 10.0 | 194.8 | 210.3 | 2.8 | 26.8 | 63.2 | |
| 1c | 52.5 | 4.3 | 14 | 13.09 | 54.1 | 50.0 | 192.9 | 210.3 | 13.4 | 41.4 | 45.4 | 81.7 |
| 1c | 52.5 | 4.3 | 14 | 13.09 | 54.1 | 10.0 | 192.9 | 210.3 | 2.9 | 30.9 | 59.1 | |

TABLE 1-continued

Optimization of cone base angle $a_1$ for a 70 mm screen high display
(all lengths in mm, throw distance = 206 mm).

| Example | R | P1 | $a_1$ | M | F | R' | $P_2$ | H | $t_7$ | $A_8$ | $\phi_1 =$ $(90 - A_8)$ | Screen Height |
|---------|------|-----|----|-------|------|------|-------|-------|------|------|------|------|
| 1d | 52.5 | 4.3 | 16 | 15.05 | 54.6 | 50.0 | 190.9 | 210.3 | 13.4 | 45.4 | 44.6 | 73.1 |
| 1d | 52.5 | 4.3 | 16 | 15.05 | 54.6 | 10.0 | 190.9 | 210.3 | 2.9  | 34.9 | 55.1 |      |

This 16° calculated cone angle used was confirmed by construction of a variable cone mirror and examining its projection onto the display area. The rays striking the label area, used for the cylindrical display area, did so in the range of incident angle $\phi_1$=44.6° (top of label)-55.1° (bottom of label).

Example 2

Characterization of RPF

Useful screen materials include beaded film in a black matrix from 3M Company. The glass bead refractive index in such films is adjusted to control the focal point position with respect to the exit aperture. For the projection screen configuration shown in FIG. 10a with optical bench set-up shown in FIG. 9a, a luminance versus incident light angle plot was obtained (see FIG. 13). This plot confirmed that maximum luminance occurred at an incident angle $\phi_1$=0°. The luminance dropped off to 50% of the maximum value at about $\phi_1$=15°. In designing displays according to the embodiment represented by the Examples, the image turning film was optimized so that it causes light to impinge onto the RPF at a value close to 0°.

Example 3

Evaluation of Image Turning Film for the Bottle Display

Figure 13:
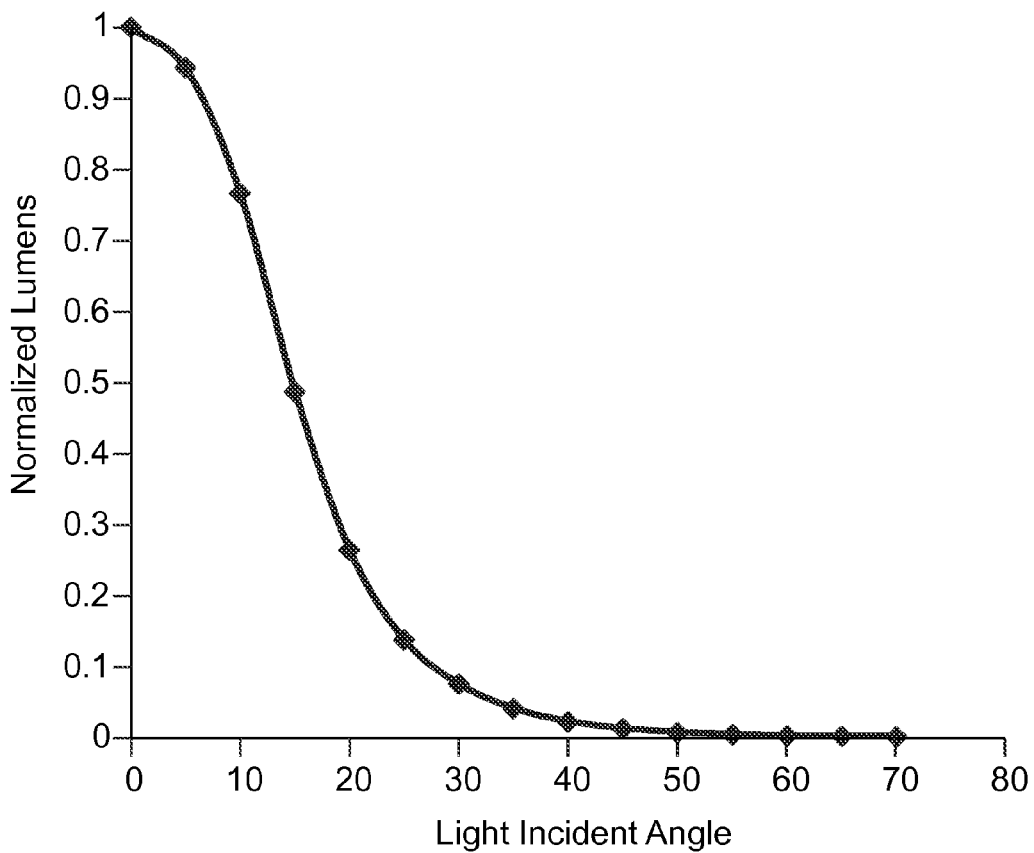
FIG. 13 is a graph of a characterization of the rear projection film for the Examples.

Example 1 showed that the 16° cone mirror caused light to impinge onto the label (display) area at about $\phi_1$=45°-55°. However, FIG. 13 shows very little (<5%) luminance output from the RPF at such steep incident angles.

Figure 14:
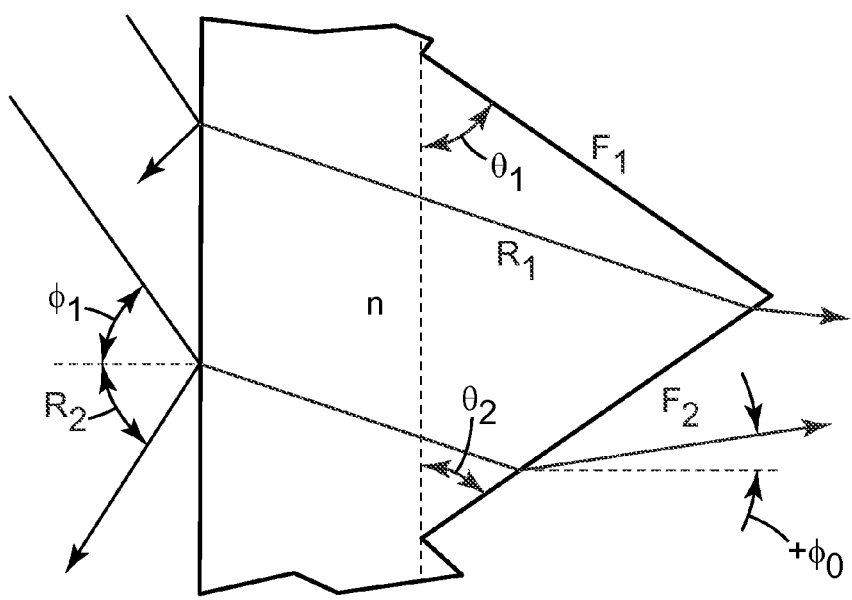
FIG. 14 is a cross-sectional view of the turning film lens for the Examples.

FIG. 14 is a diagram of a turning film cross-section having the structured surface facing the RPF. This film can be optimized to direct light toward the RPF at the desired angle $\phi_o$ according to the following equation where the refractions at the air/plano surface and the facet ($F_2$)/air interface determine the turning effect for light redirection. The turning angle increases with increasing $\theta_2$ and refractive index n.

$\phi_o = \sin^{-1}[n \sin \{\theta_2 - \sin^{-1}((1/n)\sin(\phi_1))\}] - \theta_2$ Hence, a predictive incident angle $\phi_1$ of 39° can be derived for a turning film with refractive index (n) of 1.5, exit angle $\phi_o$=0°, and prism angle $\theta_2$=60°. This value of $\phi_1$=39° suggested that this image directing film in tandem with the projector and cone mirror set-up of Example 1 would result in a display of reasonable brightness. To confirm this, a luminance versus incident light angle plot was obtained using the optical set-up shown in FIG. 9a with a display configuration shown in FIG. 10b. The configuration of FIG. 10b used an image directing film of RI=1.5 and prism angles $\theta_1$=$\theta_2$=60° and a beaded RPF sheet. The configuration in FIG. 10b has an image directing film opposite the viewer side and a beaded RPF sheet on the viewer side with both supported by a glass sheet between them. Maximum luminance occurred at about $\phi_1$=40°, similar to the predictive value of $\phi_1$=39°. Although $\theta_1$=$\theta_2$ in FIG. 14, $\theta_1$ need not equal $\theta_2$ for turning films in other embodiments.

Figure 15:
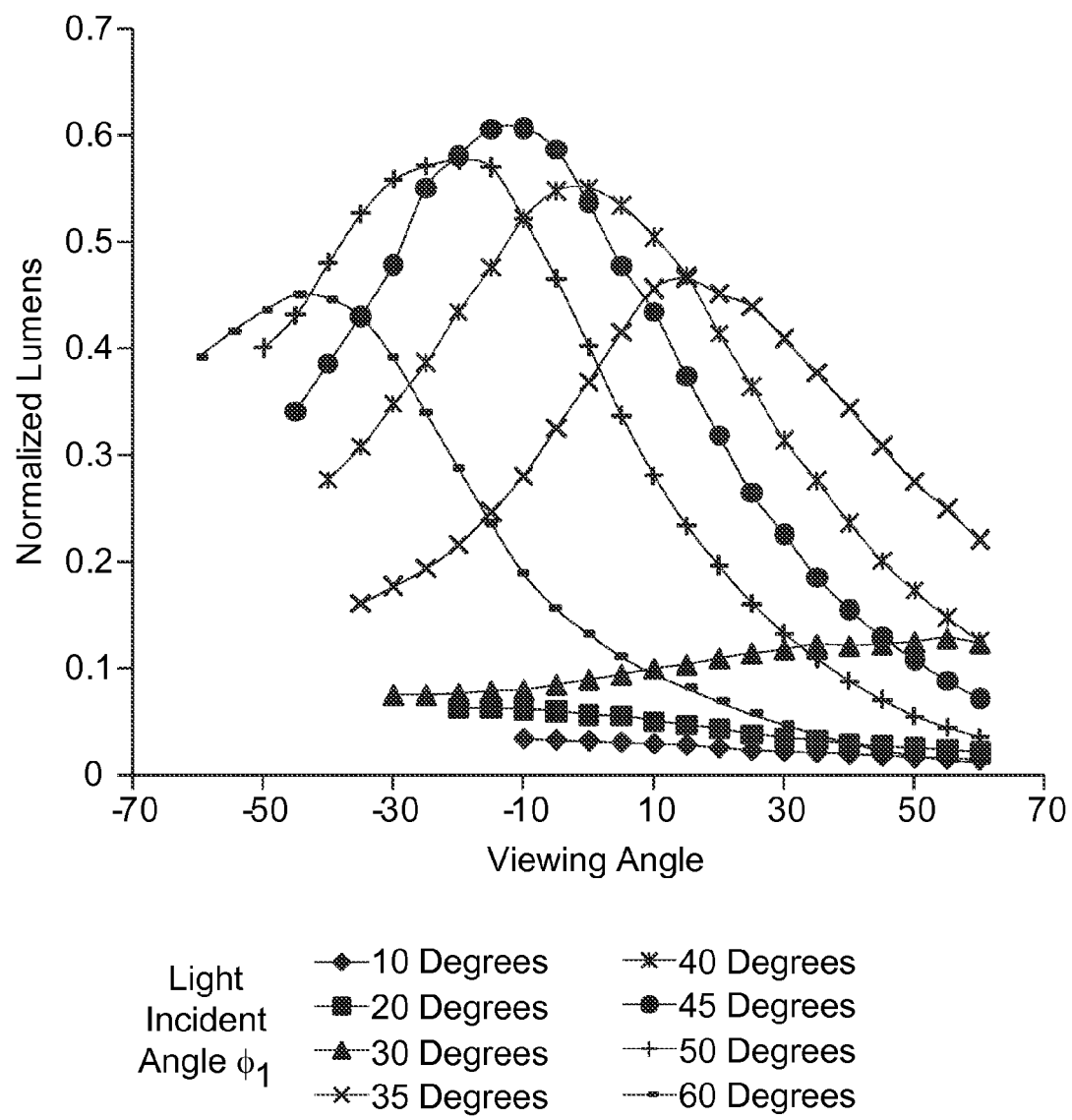
FIG. 15 is a graph of a normalized luminance of the turning film for the Examples.

The relative luminance of the proposed display comprising the screen configuration shown in FIG. 10b with the MPro 160 pico-projector and 16° cone mirror can be estimated by comparing the incident angles at the top and bottom of the screen with the screen luminance curve of FIG. 15.

TABLE 2

Relative luminance of display comprising the MPro 160 pico-projector, 16° cone mirror, and display screen of FIG. 10b.

|  | $\phi_1$ (deg) | Prism film angle $\theta_2$ (deg) | Incident light angle $\phi_o$ on RPF (deg) | Relative luminance (%) |
|---|---|---|---|---|
| Top of display area | 45 | 60 | −7.6 | 85 |
| Bottom of display area | 55 | | −17.3 | 35 |

Example 4

Optimization of Image Turning Film for the Bottle Display to Provide a Display of Uniform Image Brightness The display described in Example 3 can be adjusted so as to produce an image of uniform brightness on the RPF. This uniformity was achieved by use of an image directing film with gradient prism angle to account for the variation in incident light angle coming from the cone mirror. The following table, utilizing the equation given in Example 3, shows that for the bottle display a prismatic film sheet of RI=1.5 and prism angle 65°-73° accomplished the uniform brightness.

TABLE 3

Relative luminance of display using the MPro 160 pico-projector, 16° cone mirror, and the gradient prism and display screen shown in FIG. 10b comprising gradient prism angles.

|  | $\phi_1$ (deg) | Prism film angle $\theta_2$ (deg) | Incident light angle $\phi_0$ on RPF (deg) | Relative luminance (%) |
|---|---|---|---|---|
| Top of display area | 45 | 65 | 0.0 | 100 |
|  |  | Variable |  |  |
| Bottom of display area | 55 | 73 | 0.0 | 100 |

Example 5

Figure 9B:
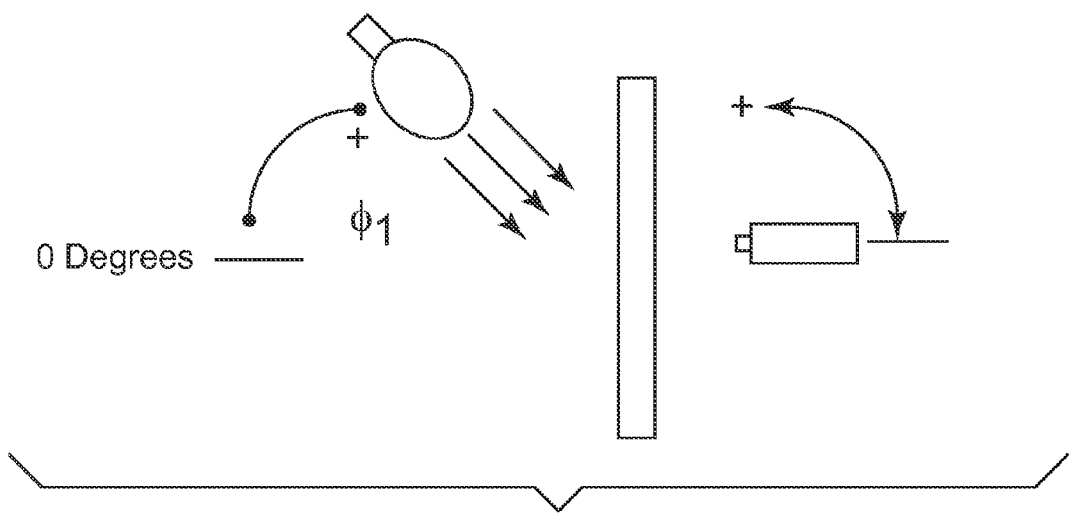

Determination of the Optimum Viewing Direction of a Display Screen of Configuration FIG. 10b Comprising 60° Prism Image Turning Film The optimum viewing direction of the display described in Example 3 was estimated from luminance versus incident light angle plots using the optical set-up shown in FIG. 9b. Here the incident light angle was varied from 10°-60° in 5° or 10° increments. At each increment the luminance meter angle was varied in 5° increments. FIG. 15 represents these plots. The optimum viewing angle as represented by the maximum light output was observed to be at −10° for an incident light angle of 45°.

Example 6

Characterization of Image Directing Films

Figure 16:
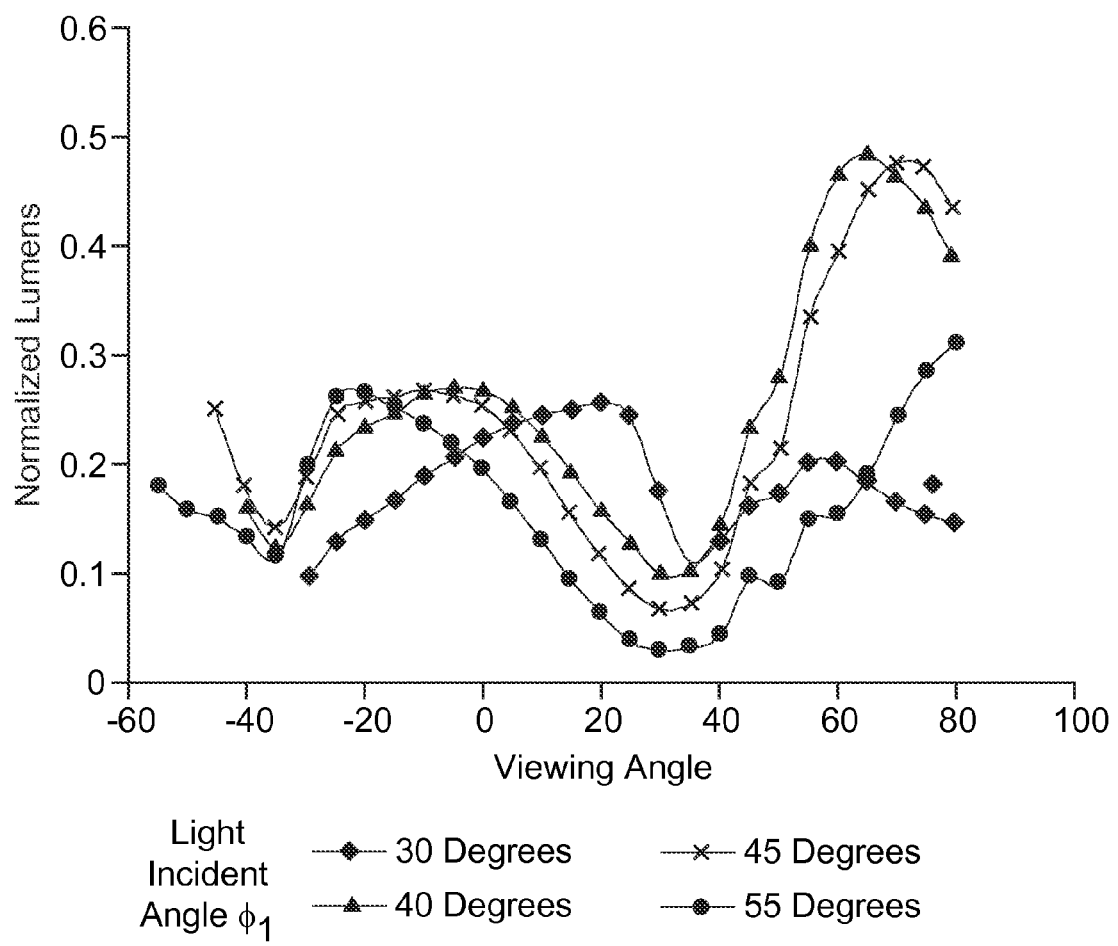
FIG. 16 is a graph of a normalized luminance of the turning film for the Examples.

FIG. 10c shows a display screen comprising a 60° image turning film, RPF, and a 60° image directing film on the viewer side of the RPF. The optimum viewing angle for this construction was determined using the optical bench set-up shown in FIG. 9b with screen test samples 9 inches×6 inches. In particular FIG. 16 shows that for an incident light angle of 45°, the optimum viewing angle was 65°-70°.

Example 7

Fabrication of 2 L Bottle Display

The display fabrication was achieved by recycling an existing 2 L COCA-COLA soda bottle (The Coca-Cola Company). The cylindrical label area was cut away and replaced by a glass cylinder of equal outer radius. The inner glass surface was lined with the 60° turning film using 3M optically clear adhesive (3M Company) at the seam according to the configuration of Example 3. The outer surface was covered with the beaded RPF using 3M SCOTCH ATG double sided tape adhesive transfer tape (3M Company) at the seam. The top of the cylinder was fitted with a 16°-base angle cone mirror using 3M SCOTCH-WELD DP-100 epoxy adhesive (3M Company). The mirror was fashioned by cutting out a circular disk of the Enhanced Specular Reflector (ESR) film product (3M Company) and shaping this disk into a cone. The lower part of the bottle was partitioned into two chambers. The outer chamber contained liquid while the inner chamber allowed for optical access to the ESR mirror via a hole drilled in the bottom of the bottle to create the aperture described above. The projector was placed at the aperture 210 mm below the base of the ESR mirror cone as depicted in FIG. 12.

Example 8

Pixel Remapping

Figure 17:
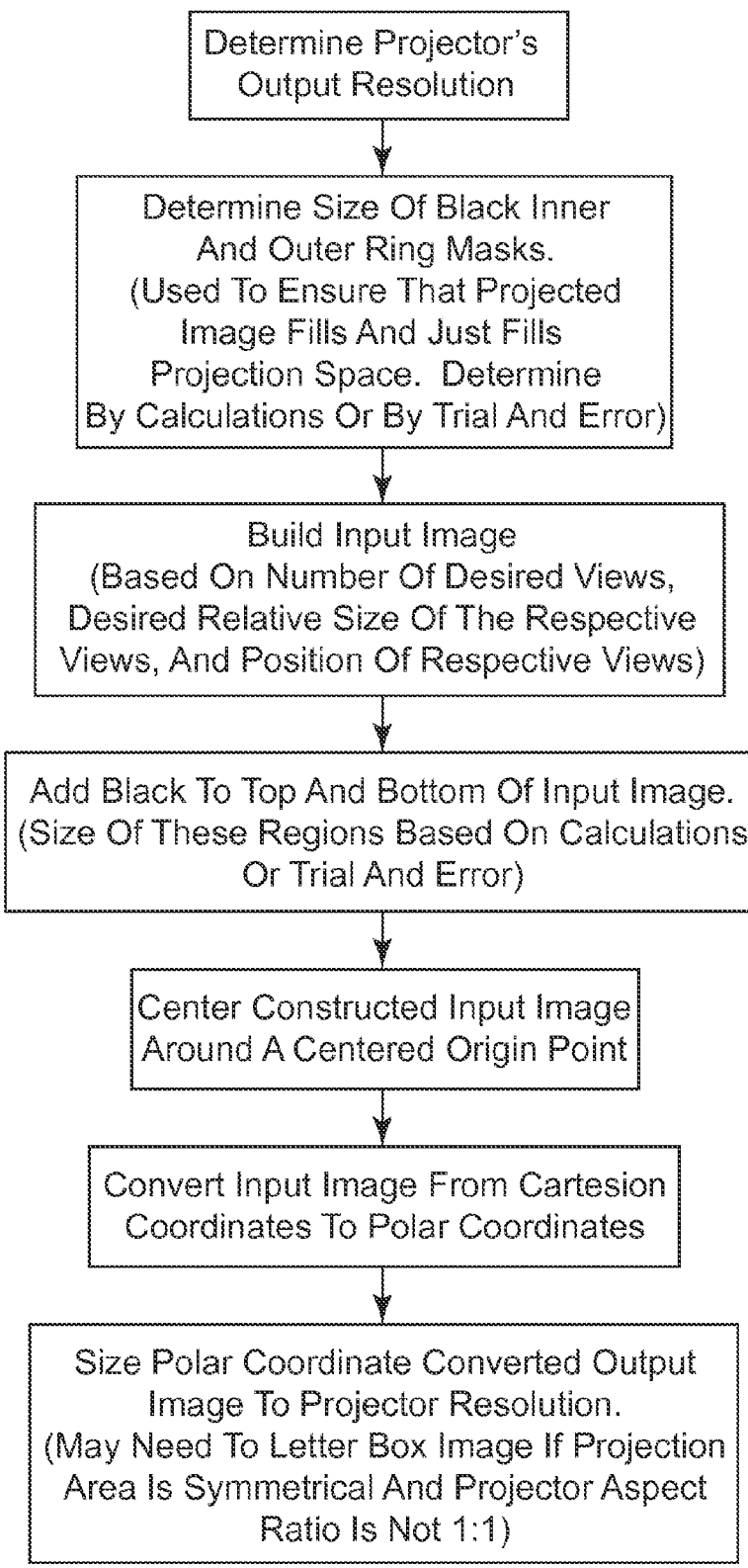
FIG. 17 is a flow chart of an image remapping algorithm to convert content for display onto a curved surface as used in the Examples.
Figure 18:
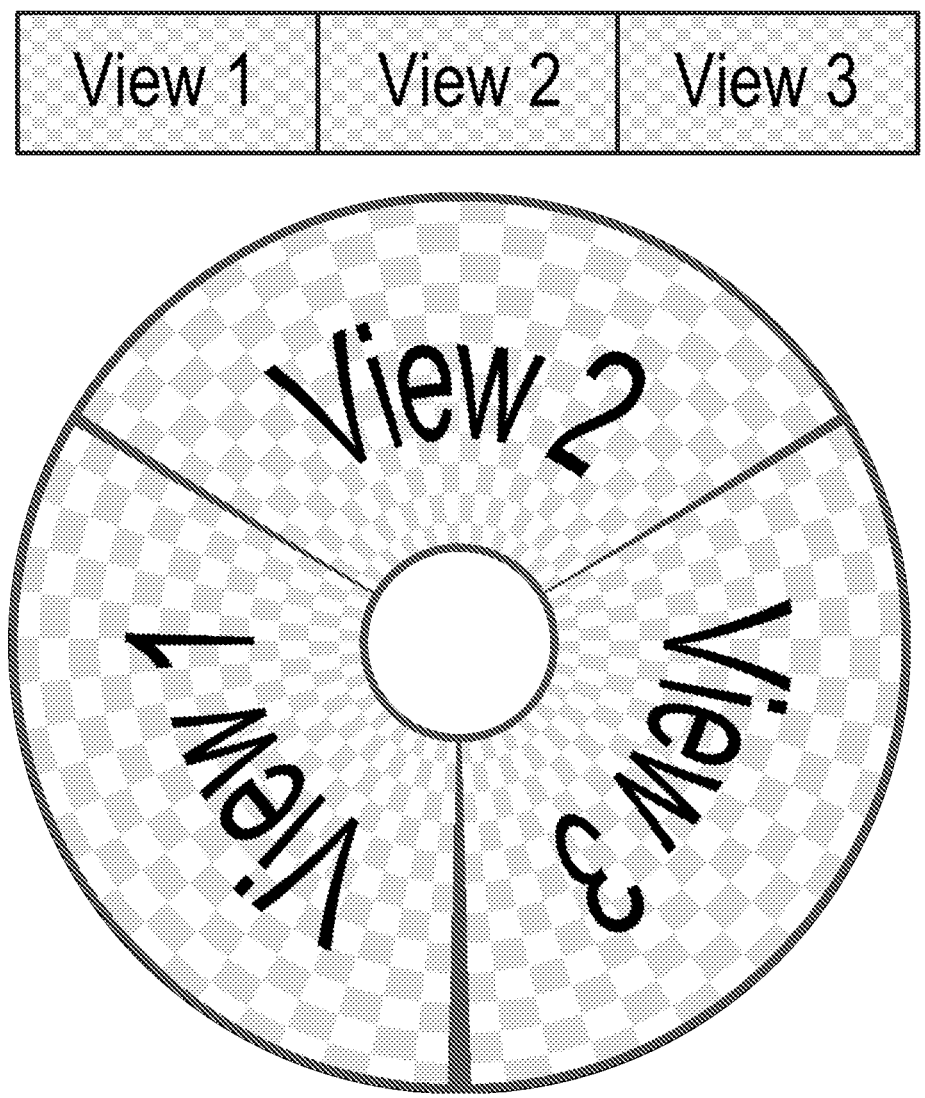
FIG. 18 is a diagram of sample input and output images for the Examples.

The block diagram shown in FIG. 17 provides the steps of converting digital imagery for viewing onto the bottle display of the Examples in an undistorted manner. The algorithm code implementing the steps shown in FIG. 17 was executed in the MATLAB program. For the 360°-view bottle display described in the Examples three image zones of 120° each were chosen. The number of input zones was arbitrary. A sample input and output file diagram is shown in FIG. 18. The top view in FIG. 18 shows the input file of View 1, View 2, and View 3. The bottom view in FIG. 18 shows the output file of View 1, View 2, and View 3 converted such that when displayed on the cylindrical display surface of the bottle display described in the Examples, the Views appear undistorted.

The invention claimed is:

1. A system for projecting changeable electronic content onto a curved surface, comprising:
 a housing having an exterior surface and an interior space, wherein at least a portion of the exterior surface is a curved display surface capable of displaying changeable electronic content projected onto the display surface, and at least one portion of the exterior surface has an aperture through the exterior surface to the interior space,
 wherein the housing has a base containing the aperture and a lid, wherein the curved display surface is located between the base and the lid, and wherein the base has an exterior wall as part of the exterior surface of the housing, an interior wall around the aperture, and a hollow space between the exterior wall and the interior wall;
 a reflector located within the interior space of the housing; and
 a projector located proximate the aperture for projecting electronic content through the aperture to the reflector,
 wherein when the projector receives converted electronic content and projects the converted electronic content through the aperture to the reflector, the curved display surface displays the converted electronic content undistorted to a viewer.

2. The system of claim 1, wherein the curved display surface has a cylindrical shape.

3. The system of claim 1, wherein the reflector comprises a cone.

4. The system of claim 3, further comprising a ring attached to a base of the cone.

5. The system of claim 1, wherein the lid has an interior hollow space.

6. The system of claim 1, wherein the lid is removable from the curved display surface, and the base is removable from the curved display surface.

7. The system of claim 1, wherein the curved display surface comprises:
 a support substrate;
 a rear projection film; and
 a turning film.

8. The system of claim 1, further comprising a controller coupled to the projector for providing the converted content to the projector.

9. The system of claim 1, wherein the content displayed on the curved display surface is related to a shape of the exterior surface of the housing.

10. The system of claim 1, wherein the changeable electronic content comprises electronic video content.

11. The system of claim 1, wherein the changeable electronic content comprises changeable electronic still images.

12. A system for projecting changeable electronic content onto a curved surface, comprising:
 a housing having an exterior surface and an interior space, wherein at least a portion of the exterior surface is a curved display surface capable of displaying changeable electronic content projected onto the display surface,
 wherein the housing has a base and a lid, wherein the curved display surface is located between the base and the lid, and wherein the base has an exterior wall as part of the exterior surface of the housing, an interior wall, and a hollow space between the exterior wall and the interior wall;

a reflector located within the interior space of the housing; and a projector located within the interior space of the housing for projecting electronic content to the reflector, wherein when the projector receives converted electronic content and projects the converted electronic content to the reflector, the curved display surface displays the converted electronic content undistorted to a viewer.

13. The system of claim 12, wherein the lid has an interior hollow space.

14. A system for projecting changeable electronic content onto a curved surface, comprising:

a housing having an exterior surface and an interior space, wherein at least a portion of the exterior surface is a curved display surface capable of displaying changeable electronic content projected onto the display surface, and at least one portion of the exterior surface has an aperture through the exterior surface to the interior space, wherein the housing has a base and a lid containing the aperture, wherein the curved display surface is located between the base and the lid, and wherein the base has an exterior wall as part of the exterior surface of the housing, an interior wall, and a hollow space between the exterior wall and the interior wall;

a reflector located within the interior space of the housing; and a projector located proximate the aperture for projecting electronic content through the aperture to the reflector, wherein when the projector receives converted electronic content and projects the converted electronic content through the aperture to the reflector, the curved display surface displays the converted electronic content undistorted to a viewer.

15. The system of claim 14, wherein the lid has an interior hollow space.

* * * * *